(12) United States Patent
Kaimori et al.

(10) Patent No.: US 12,021,472 B2
(45) Date of Patent: Jun. 25, 2024

(54) METHOD AND DEVICE INCLUDING ESTIMATING MAXIMUM WINDING TEMPERATURE AND CONTROL

(71) Applicant: Nissan Motor Co., Ltd., Yokohama (JP)

(72) Inventors: Tomoaki Kaimori, Kanagawa (JP); Kazuhiko Matsumoto, Kanagawa (JP); Kazuhiro Matsumura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 58 days.

(21) Appl. No.: 17/632,248

(22) PCT Filed: May 17, 2021

(86) PCT No.: PCT/JP2021/018691
§ 371 (c)(1),
(2) Date: Feb. 2, 2022

(87) PCT Pub. No.: WO2022/244084
PCT Pub. Date: Nov. 24, 2022

(65) Prior Publication Data
US 2023/0361713 A1 Nov. 9, 2023

(51) Int. Cl.
*H02K 11/25* (2016.01)
*H02K 5/20* (2006.01)
*H02P 29/64* (2016.01)

(52) U.S. Cl.
CPC ............ *H02P 29/64* (2016.02); *H02K 5/203* (2021.01); *H02K 11/25* (2016.01)

(58) Field of Classification Search
CPC .......... H02P 29/64; H02K 11/25; H02K 5/203
See application file for complete search history.

(56) References Cited

U.S. PATENT DOCUMENTS

| | | | |
|---|---|---|---|
| 2009/0066283 A1* | 3/2009 | Son | H02P 29/64 318/473 |
| 2011/0279074 A1* | 11/2011 | Yeh | G01K 13/08 318/473 |
| 2019/0305713 A1* | 10/2019 | Itou | H02P 3/02 |

FOREIGN PATENT DOCUMENTS

| | | |
|---|---|---|
| JP | 2001268989 A * | 9/2001 |
| JP | 2012-228131 A | 11/2012 |

(Continued)

OTHER PUBLICATIONS

JP2001268989A English translation (Year: 2024).*
JP2018074810A English translation (Year: 2024).*
WO2020246347A1 English translation (Year: 2024).*

*Primary Examiner* — Christopher M Koehler
*Assistant Examiner* — Viswanathan Subramanian
(74) *Attorney, Agent, or Firm* — Global IP Counselors, LLP

(57) ABSTRACT

A motor control method controls a motor having windings of a plurality of phases and a cooling water channel. The motor control calculates an estimated maximum temperature of the winding of the phase that reaches a highest temperature from among the windings of the plurality of phases based on the input electrical power when the motor is in a lock state. The motor control further calculates an offset value based on a detected temperature of the windings and a detected temperature of the cooling water, and corrects the estimated maximum temperature based on the temperature of the windings and the offset value. The motor control further controls the input electrical power according to the estimated maximum temperature.

7 Claims, 5 Drawing Sheets

(56) References Cited

FOREIGN PATENT DOCUMENTS

| JP | 2018-74810 A | 5/2018 | |
|---|---|---|---|
| WO | 2018/083744 A1 | 5/2018 | |
| WO | WO-2020246347 A1 * | 12/2020 | ............. H02K 11/25 |

* cited by examiner

METHOD AND DEVICE INCLUDING ESTIMATING MAXIMUM WINDING TEMPERATURE AND CONTROL

CROSS-REFERENCE TO RELATED APPLICATIONS

This application is a U.S. national stage application of International Application No. PCT/JP2021/018691, filed on May 17, 2021.

BACKGROUND

Technical Field

The present invention relates to a method for controlling a motor and a device for controlling a motor.

Background Information

A rotating electric machine (motor) has a plurality of phases U, V, and W, and is provided with windings corresponding to each of the phases. The motor rotates by having an electrical current fed to the windings of each of the phases. The windings produce heat due to channeling the electrical current.

In a "motor lock" state, in which an attempt is made to generate torque while the motor is stopped or rotating extremely slowly, electrical current might concentrate in a winding of a specific phase (e.g., the U-phase), and heat generated by the winding will increase in amount. A very large amount of heat generated by a winding could degrade an insulation member of the winding, and it is therefore necessary to perform control so as to avoid such instances.

JP2012-228131A discloses a system for controlling driving of a rotating electric machine for acquiring a coil temperature and an electrical current value in a motor when a motor lock state occurs, calculating a possible lock time, and if locking is not cancelled within the possible lock time, performing an electrical current concentration suppression process in which electrical current is also channeled elsewhere other than a specific phase in which electrical current concentration occurs.

SUMMARY

In a case in which control is performed upon acquiring a coil temperature as with the prior art, depending on how a sensor for acquiring the coil temperature is arranged, it may not be possible to detect a temperature of a winding of a phase in which an amount of heat generated is the greatest; therefore, control may be impossible to perform in an appropriate manner.

In view of such a problem, the purpose of the present invention is to provide a method for controlling a motor with which it is possible to suppress the amount of heat generated by windings in a motor lock state.

One aspect of the present invention is applied to a method for controlling a motor provided with windings of a plurality of phases and a cooling water channel. The motor is provided with a winding temperature detection unit for detecting a temperature of the windings, a cooling water temperature detection unit for detecting a temperature of cooling water, a rotation detection unit for detecting rotation of the motor, and an input electrical power estimation unit for estimating input electrical power inputted into the motor. The control method is provided with: an estimation step for calculating, when the motor is in a lock state, an estimated maximum temperature of a winding of a phase that reaches a highest temperature from among the windings of a plurality of phases, based on the input electrical power; a correction step for calculating an offset value based on the detected temperature of the windings and the detected temperature of the cooling water, and correcting the estimated maximum temperature based on the temperature of the windings and the offset value; and a control step for controlling the input electrical power according to the corrected estimated maximum temperature.

According to the present invention, an offset value is calculated based on a temperature of windings and a temperature of cooling water, and an estimated maximum temperature of a winding is corrected with the offset value, therefore making it possible to control an input electrical power of a motor using a temperature value for which there is little deviation from an actual winding temperature. As a result, fewer restrictions are applied on a torque command for a motor, while an amount of heat generated by the windings is suppressed, even in a motor lock state.

BRIEF DESCRIPTION OF THE DRAWINGS

Referring now to the attached drawings which form a part of this original disclosure.

DETAILED DESCRIPTION OF EMBODIMENTS

Figure 1:
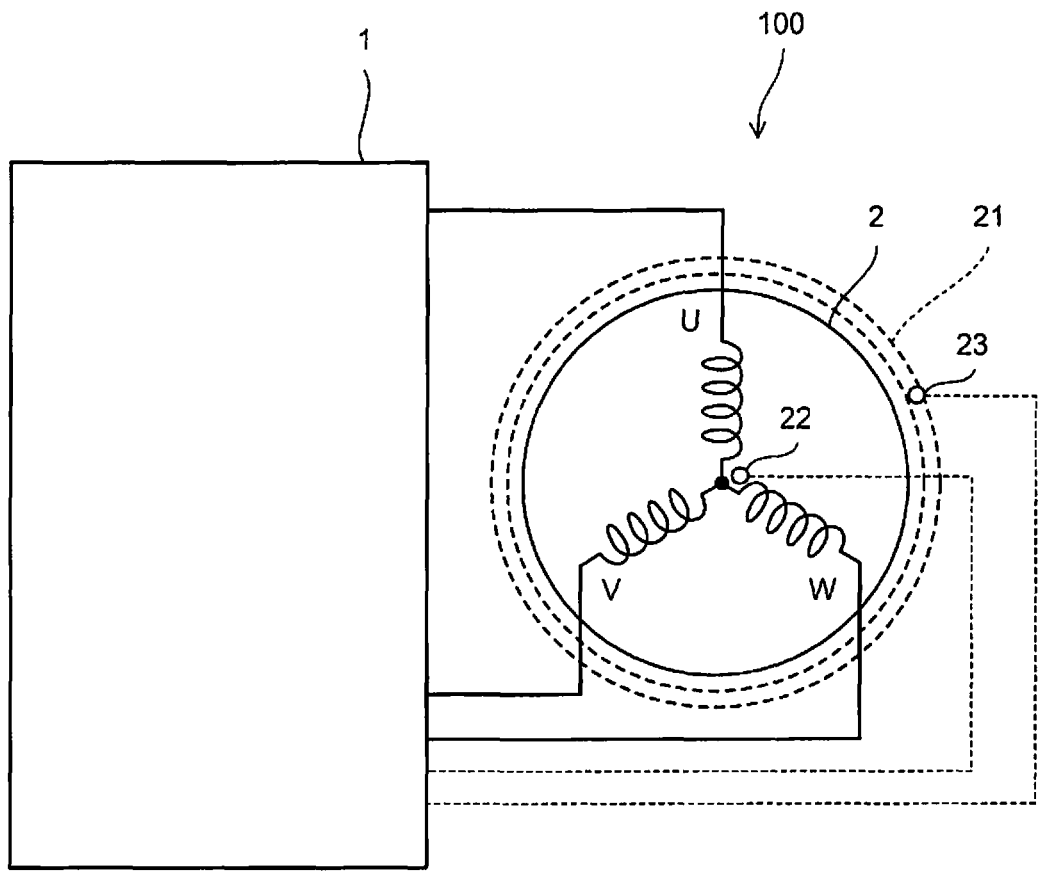
FIG. 1 is an explanatory diagram of a motor control system according to an embodiment of the present invention.
Figure 2:
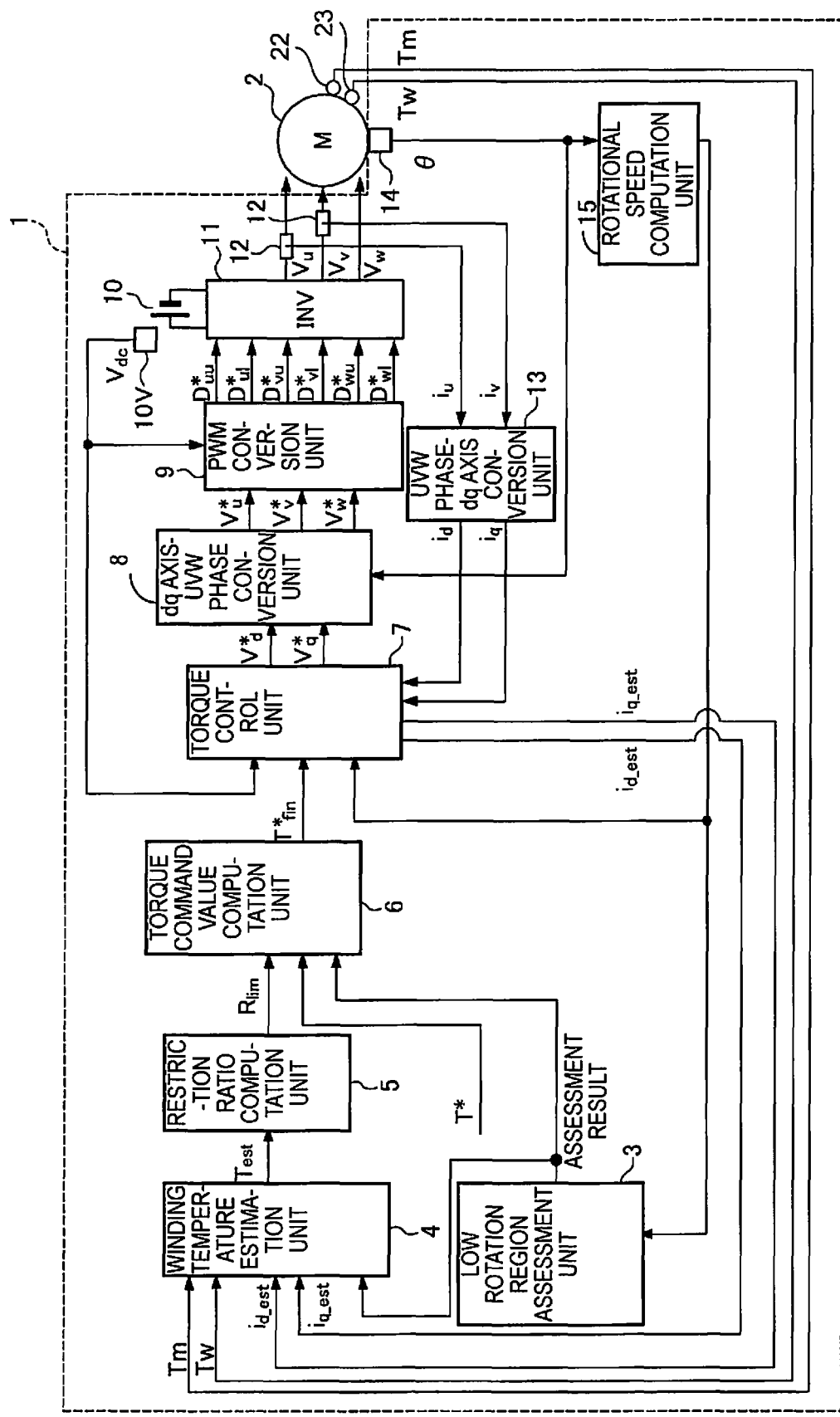
FIG. 2 is a configuration diagram of a motor control device.

A preferred embodiment of the present invention will now be described. FIG. 1 is an explanatory diagram of a motor control system 100 of the present embodiment, and FIG. 2 is a configurational diagram of a motor control device 1.

The motor control system 100 is provided with a motor control device 1 and a rotating electric machine (motor) 2. The motor control system 100 is installed in, e.g., an electric vehicle and used as a drive source for the electric vehicle.

The motor control device 1: calculates, based on a torque command value T*, a rotational speed of the motor 2, and temperatures of windings, a command value for driving the motor 2; and outputs, based on the command value, electrical power to be fed to stator windings of the motor 2.

The motor 2 is configured as a synchronous motor provided with windings of a plurality of phases (e.g., three phases of U-phase, V-phase, and W-phase). The motor 2 is provided with a water jacket 21, and is cooled by cooling water flowing through the water jacket 21. The motor 2 is provided with a winding temperature sensor 22 for detecting a winding temperature Tm of the motor 2, and a cooling water temperature sensor 23 for detecting a cooling water temperature Tw of the water jacket 21.

The motor 2 may experience a "motor lock" state, in which an attempt is made to generate torque while rotation of the motor 2 is in a stopped or an extremely slow state. In a motor lock state, electrical current might concentrate in a winding of a specific phase, and heat generated by the winding will increase in amount.

A very large amount of heat generated by a winding could degrade an insulation member of the winding. Therefore, it is necessary, when the winding temperature becomes high, to restrict electrical current fed to the motor 2.

On the other hand, there is a problem of it being difficult to detect an actual winding temperature. As discussed above, the motor 2 is provided with a winding temperature sensor 22 for detecting the winding temperature Tm; however, the winding temperature sensor 22 is not necessarily able to detect the highest temperature of the windings.

In response, it is possible to perform control based on a temperature value obtained by providing a sufficient margin to the detected winding temperature Tm in anticipation of the temperature of the windings increasing. However, if control is performed in such a manner, a restriction on electrical current may be imposed even when a load on the motor 2 is small and the actual winding temperature is low, resulting in a possibility of the motor 2 failing to satisfy the required torque, affecting drivability.

As a result, it has not necessarily been possible in the past to appropriately control the motor 2 based on the temperature of the windings.

As a result of a creative approach to the problem discussed above, the present embodiment is configured such that an estimate is made of a temperature in which deviation from the actual winding temperature is small, by using an offset value discussed further below.

FIG. 2 is a configurational block diagram of the motor control device 1.

The motor control device 1 has a microcomputer provided with a CPU, a storage device, etc. The CPU executes a program recorded in the storage device, whereby functions of various units illustrated in FIG. 2 are realized.

It is possible to house the motor control device 1 illustrated in FIG. 2 in a same casing, and it is also possible for a battery 10 and an inverter 11 discussed further below to be housed in difference casings, with an electrical connection established therebetween by a harness, etc.

The motor control device 1 is provided with a low-rotation region assessment unit 3, a winding temperature estimation unit 4, a restriction ratio computation unit 5, a torque command value computation unit 6, a torque control unit 7, a dq axis-UVW phase conversion unit 8, a PWM conversion unit 9, a UVW phase-dq axis conversion unit 13, and a rotational speed computation unit 15 as a configuration for mainly performing computations. The motor control device 1 is provided with a battery 10 and an inverter 11 as a configuration mainly relating to feeding electrical power to the motor 2. The motor control device 1 is provided with a voltage sensor 10V, an electrical power sensor 12, a rotor position sensor 14, a winding temperature sensor 22, and a cooling water temperature sensor 23, as various types of sensors.

The low-rotation region assessment unit 3 assesses whether the motor 2 is in a low-rotation region or a high-rotation region based on the rotational speed of the motor 2. More specifically, the low-rotation region assessment unit 3 acquires a value N detected for the rotational speed of the motor 2 calculated by the rotational speed computation unit 15, compares the acquired rotational speed detection value N and an assessment threshold, and assesses whether the motor 2 is currently in a low-rotation region or a high-rotation region. The assessment threshold is set to a value with which it is possible to assess whether the motor 2 is in a lock state, e.g., a value of zero to several tens of revolutions per minute.

The winding temperature estimation unit 4 calculates an estimated maximum temperature $T_{est}$ of the windings of the motor 2. The estimated maximum temperature $T_{est}$ is an estimated value for a maximum temperature of a winding that is the highest from among the plurality of windings, and is computationally obtained so as to be a higher value than the actual maximum temperature of the windings.

The winding temperature estimation unit 4 calculates, based on a d-axis electrical current estimation value $i_{d\_est}$ q-axis electrical current estimation value $i_{q\_est}$, the rotational speed detection value N, the winding temperature Tm, and the cooling water temperature Tw, the estimated maximum temperature $T_{est}$, which is an estimated value for the highest temperature of the windings reached, and outputs the estimated maximum temperature $T_{est}$ to the restriction ratio computation unit 5. Details of the operation of the winding temperature estimation unit 4 will be discussed further below with reference to FIG. 3.

The restriction ratio computation unit 5 calculates, based on the estimated maximum temperature $T_{est}$, a torque restriction ratio $R_{lim}$ used for restricting a drive torque of the motor 2.

Figure 4:
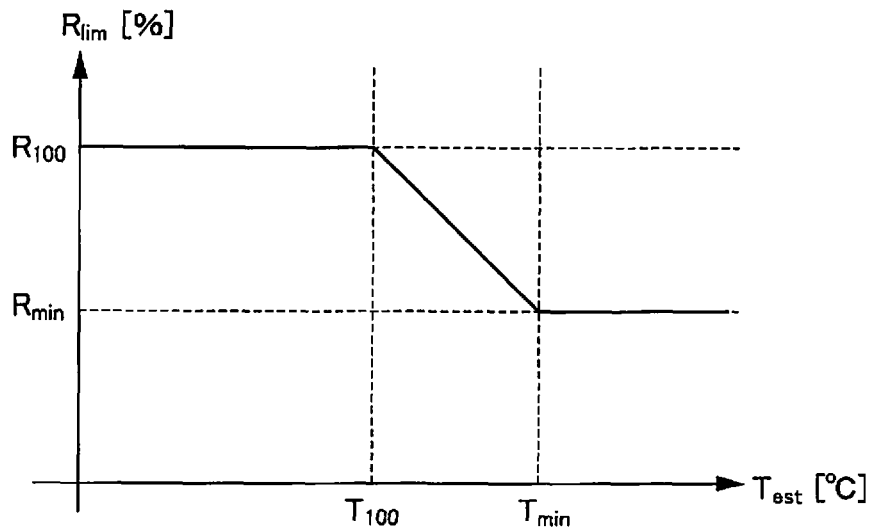
FIG. 4 is an explanatory diagram for a torque restriction ratio.

The restriction ratio computation unit 5 calculates the torque restriction ratio $R_{lim}$, with reference to the graph illustrated in FIG. 4, according to the estimated maximum temperature $T_{est}$ estimated by the winding temperature estimation unit 4. The torque restriction ratio Rum is a command value (percentage) that determines how much the torque is to be restricted with respect to the torque command value T*, and is a value that varies from no restriction (R100: 100%) to a maximum adjustment rate ($R_{min}$: e.g., 50%) according to the value of the estimated maximum temperature $T_{est}$ calculated by the winding temperature estimation unit 4.

FIG. 4 is a graph used for calculating the torque restriction ratio $R_{lim}$, and is stored in advance in the restriction ratio computation unit 5.

In the graph illustrated in FIG. 4, the torque restriction ratio $R_{lim}$ is set so as to vary between a torque restriction lower limit value $R_{min}$, which is the largest restriction ratio for suppressing insulation degradation caused by a winding being at a high temperature, and $R_{100}$ at which the torque is not restricted, according to the estimated maximum temperature $T_{est}$.

A temperature threshold $T_{100}$ is the highest winding temperature at which the temperature of the windings does not cause insulation degradation, and a temperature threshold $T_{min}$ is the lowest winding temperature at which insulation degradation can be suppressed by performing a restriction using the torque restriction lower limit value $R_{min}$, even if the estimated maximum temperature $T_{est}$ increases.

Therefore, when, in a motor lock state, the estimated maximum temperature $T_{est}$ is exceeding the temperature threshold $T_{100}$, the torque command value T* is multiplied by the torque restriction lower limit value $R_{min}$ calculated based on the above graph, whereby the electrical current flowing through the motor 2 is restricted.

The torque command value computation unit 6 illustrated in FIG. 2 calculates a final torque command value $T^*_{fin}$, which is the torque with which the motor 2 is actually driven, based on the torque command value T* commanded by a higher system.

The torque command value T*, the torque restriction ratio Rlim computationally obtained by the restriction ratio computation unit 5, and a result of the assessment by the low-rotation region assessment unit 3 are inputted into the torque command value computation unit 6. From these values, the torque command value computation unit 6 outputs, the torque command value T* as the final torque command value T*$_{fin}$ without modification to the torque control unit 7 if it is assessed that the motor 2 is in a high-rotation region. If it is assessed that the motor 2 is in a low-rotation region, i.e., in a motor lock state, the torque command value computation unit 6 calculates, as the final torque command value T*$_{fin}$, a value obtained by multiplying the torque command value T* by the torque restriction ratio R$_{lim}$, and outputs the calculated final torque command value T*$_{fin}$ to the torque control unit 7.

Thus, the torque command value computation unit 6 executes, in a motor lock state, a control step of multiplying the torque command value T* by the torque restriction ratio R$_{lim}$ calculated based on the winding temperature Tm and the offset value and thereby restricting the torque command value T*, and controlling the input electrical power inputted into the motor 2. In other words, the torque command value computation unit 6 constitutes a control unit.

The torque control unit 7 calculates, according to the final torque command value T*$_{fin}$, a battery voltage detection value V$_{dc}$, the rotational speed detection value N, a d-axis electrical current value i$_d$, and a q-axis electrical current value i$_q$, a d-axis voltage command value V*$_d$ and a q-axis voltage command value V*$_q$. The torque control unit 7 outputs these calculated voltage command values to the dq axis-UVW phase conversion unit 8.

The dq axis-UVW phase conversion unit 8 converts the d-axis voltage command value V*$_d$ and the q-axis voltage command value V*$_q$ to UVW-phase voltage command values V*$_u$, V*$_v$, and outputs the UVW-phase voltage command values V*$_u$, V*$_v$, to the PWM conversion unit 9.

The PWM conversion unit 9 outputs, based on the UVW-phase voltage command values V*$_u$, V*$_v$, V*$_w$, command values (D*$_{uu}$, D*$_{ul}$, D*$_{vu}$, D*$_{vl}$, D*$_{wl}$) for the inverter 11.

The inverter 11 is made of a three-phase power semiconductor, and converts, based on the command values outputted from the PWM conversion unit 9, DC electrical power fed from the battery 10 into three-phase AC electrical power and feeds the three-phase AC electrical power to the motor 2. The motor 2 is driven by the three-phase AC electrical power fed from the inverter 11.

Current sensors 12 are provided to an output-side terminal of the inverter 11, and detect current values iu, iv of at least two phases of the three-phase electrical power. A rotor position sensor 14 is provided to the motor 2 and detects an electrical angle detection value θ for the motor 2. The detected current values i$_u$, i$_v$ and the electrical angle detection value θ are inputted into the UVW phase-dq axis conversion unit 13. The UVW phase-dq axis conversion unit 13 performs a conversion from the inputted values to dq-axes-current values i$_d$, i$_q$ and outputs the result to the torque control unit 7.

The electrical angle detection value θ outputted from the rotor position sensor 14 of the motor 2 is converted into a rotational speed detection value N for the motor 2 by the rotational speed computation unit 15, and outputted to the low-rotation region assessment unit 3 and the torque control unit 7. The rotor position sensor 14 is constituted by e.g., a Hall sensor.

The winding temperature sensor 22 of the motor 2 detects the winding temperature Tm of the motor 2. The winding temperature Tm is a value that varies according to electrical currents flowing for each of the phases. In the present embodiment, the winding temperature sensor 22 is disposed at a position, at a coil end, corresponding to a neutral point to which the respective phases formed by the windings are connected to each other, as discussed further below with reference to FIG. 7. A value detected by the winding temperature sensor 22 is outputted as the winding temperature Tm.

As illustrated in FIG. 1, the cooling water temperature sensor 23 is provided to the water jacket 21 of the motor 2 and detects the cooling water temperature Tw of the cooling water flowing through the water jacket 21. The winding temperature sensor 22 and the cooling water temperature sensor 23 are configured from, e.g., a thermistor.

Figure 3:
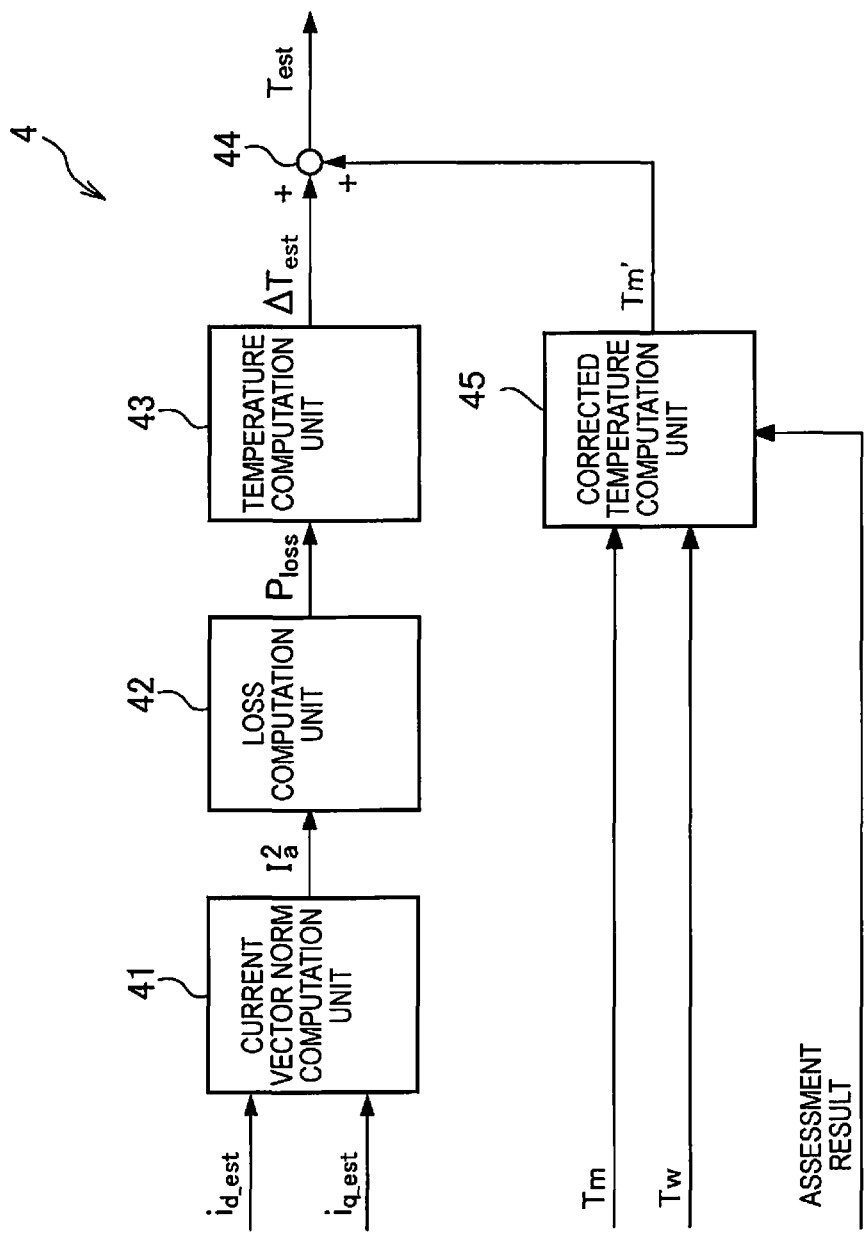
FIG. 3 is a detailed configurational diagram of a winding temperature estimation unit

FIG. 3 illustrates details of the winding temperature estimation unit 4.

The winding temperature estimation unit 4 is provided with a current vector norm computation unit 41, a loss computation unit 42, a temperature computation unit 43, an adder 44, and a corrected temperature computation unit 45.

The current vector norm computation unit 41 acquires the d-axis electrical current estimation value i$_{d\_est}$ and the q-axis electrical current estimation value i$_{q\_est}$ used for computation in the torque control unit 7, and calculates, based on the d-axis electrical current estimation value i$_{d\_est}$ and the q-axis electrical current estimation value i$_{q\_est}$, a current vector norm value Ia², which is a value indicating a total current inputted into the motor 2. The current vector norm value I$_a^2$ is calculated from a product of the d-axis electrical current estimation value i$_{d\_est}$ and the q-axis electrical current estimation value i$_{q\_est}$.

The current vector norm computation unit 41 may acquire, instead of the d-axis electrical current estimation value i$_{d\_est}$ and the q-axis electrical current estimation value i$_{q\_est}$, the d-axis current value i$_d$ and the q-axis current value i$_q$, which are current values actually inputted into the motor 2, from the UVW phase-dq axis conversion unit 13. In addition, instead of current values, a total electrical power inputted into the motor 2 may be estimated, based on the torque command value T*.

The loss computation unit 42 multiplies the current vector norm value I$_a^2$ and a heat resistance R$_{loss}$ of the motor 2 and thereby calculates electrical power loss Floss. The heat resistance R$_{loss}$ is a value indicating a heat resistance of the motor 2 as a whole, and is a value obtained in advance according to a structure of the windings, etc., of the motor 2. The electrical power loss P$_{loss}$ of the motor 2 as a whole is calculated by multiplying the current vector norm value I$_a^2$ indicating the current value flowing through the motor 2 by the heat resistance R$_{loss}$.

The temperature computation unit 43 calculates, from the electrical power loss Floss, an estimated temperature change ΔT$_{est}$, which is the largest temperature increase in the windings of three phases of the motor 2, using a transfer function G(s). The transfer function G(s) is a transfer function having a dynamic characteristic of at least the first order or higher, and is a function set in advance according to the structure of the windings, etc., of the motor 2.

The adder 44 adds the estimated temperature change ΔT$_{est}$ and a corrected winding temperature Tm' calculated by the corrected temperature computation unit 45, and thereby calculates the estimated maximum temperature T$_{est}$ of the winding, from among the windings of a plurality of phases in the motor 2, in which the temperature becomes the highest.

The corrected temperature computation unit 45 calculates the corrected winding temperature Tm' based on the winding temperature Tm acquired by the winding temperature sensor 22, the cooling water temperature Tw acquired by the cooling water temperature sensor 23, and the result of the assessment by the low-rotation region assessment unit 3. The calculated corrected winding temperature Tm' is outputted to the adder 44.

Thus, in the winding temperature estimation unit 4, the estimated maximum temperature $T_{est}$ is calculated according to the winding temperature Tm and the current vector norm value $I_a^2$, which is a value indicating the total electrical current inputted into the motor 2, whereby an estimation step is executed. The winding temperature estimation unit 4 constitutes an estimation unit.

Next, a specific operation of the corrected temperature computation unit 45 will be described. When there is a motor lock state in view of the result of the assessment by the low-rotation region assessment unit 3, the corrected temperature computation unit 45 references a graph of offset values (see FIG. 5) stored in advance, and acquires an offset value corresponding to the winding temperature Tm acquired from the winding temperature sensor 22 and the cooling water temperature Tw acquired from the cooling water temperature sensor 23.

The corrected temperature computation unit 45 adds the offset value obtained from the graph to the winding temperature Tm for when there is a motor lock state, and thereby calculates the corrected winding temperature Tm'.

Thus, when there is a motor lock state, the corrected temperature computation unit 45 calculates an offset value according to the winding temperature Tm and the cooling water temperature Tw and adds the offset value to the winding temperature Tm to calculate the corrected winding temperature Tm', and the adder 44 calculates the estimated maximum temperature $T_{est}$ based on the corrected winding temperature Tm', whereby a correction step is executed. The corrected temperature computation unit 45 and the adder 44 constitute a correction unit.

Figure 5:
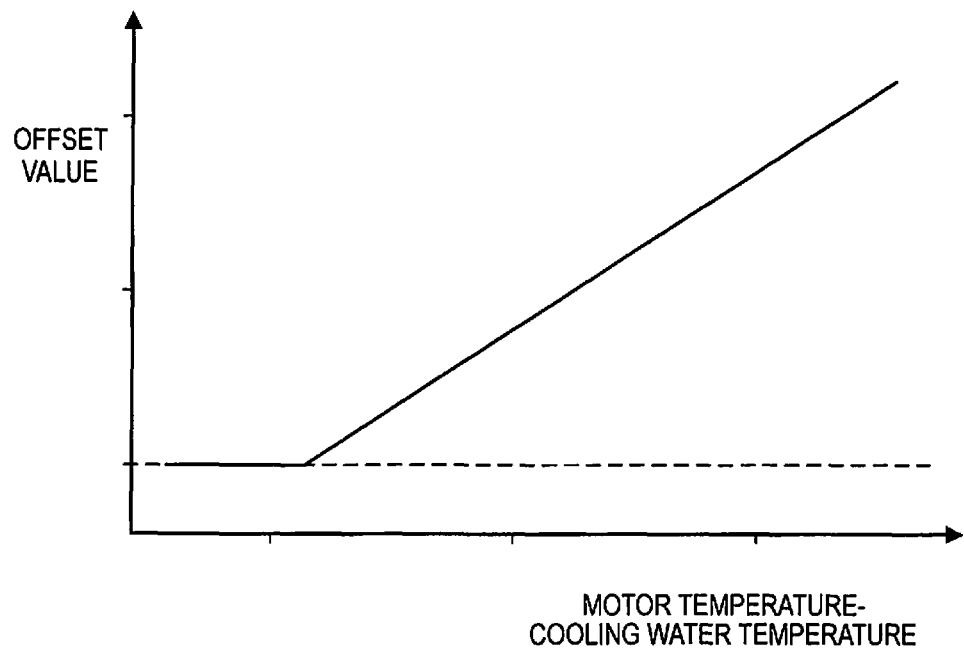
FIG. 5 is an explanatory diagram for an offset value.

FIG. 5 is an example of a graph of offset values, stored in advance by the corrected temperature computation unit 45.

This graph records offset values, which are values indicating a size of deviation between the highest actual winding temperature of the windings reached and the winding temperature Tm acquired by the winding temperature sensor 22, with respect to difference values between the winding temperature Tm and the cooling water temperature Tw.

The winding temperature sensor 22 is not necessarily provided at a position in the motor 2 that reaches the highest temperature, and also detects a temperature lower than the actual winding temperature due to heat transfer between the winding surfaces and the sensor or a response delay in the sensor, etc. In contrast, in the present embodiment, the corrected winding temperature Tm' obtained by adding the offset value to the winding temperature Tm can be a value for which deviation from the actual winding temperature is small.

The values depicted in the graph illustrated in FIG. 5 vary according to the structure of the windings of the motor 2, a heat transfer coefficient with respect to heat transfer with the cooling water, or a position of the winding temperature sensor 22, etc., and is obtained in advance by experimentation, etc.

Figure 6:
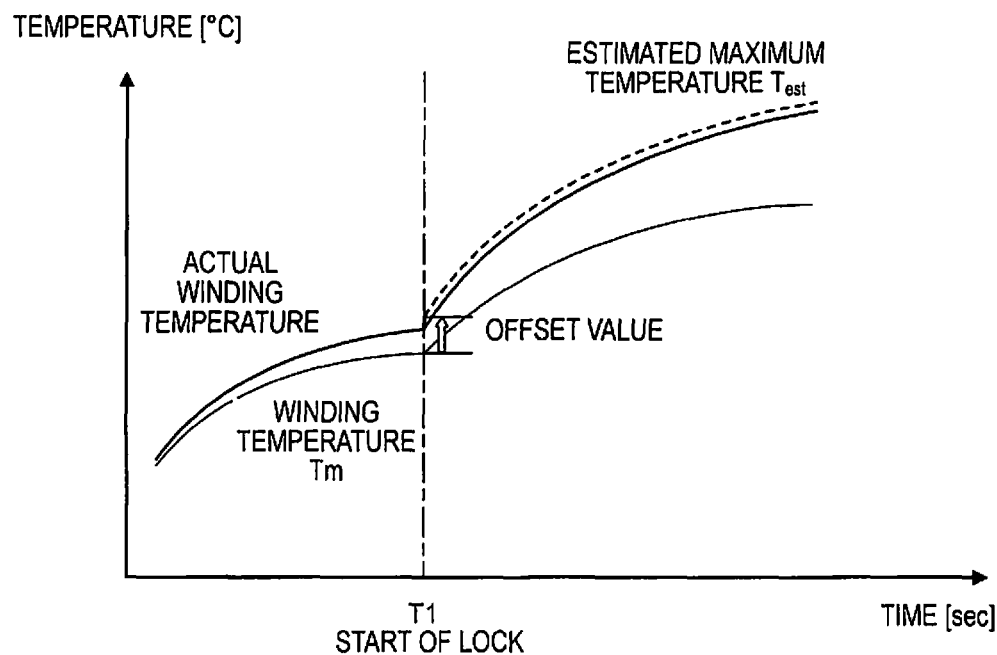
FIG. 6 is an explanatory diagram for an estimated maximum temperature during motor lock.

FIG. 6 is a time chart illustrating a relationship between the winding temperature Tm and the estimated maximum temperature $T_{est}$.

As discussed further above, the winding temperature Tm acquired by the winding temperature sensor 22 is detected as a value smaller than the actual winding temperature.

Here, the motor 2 enters a motor lock state at timing T1 in FIG. 6. When a motor lock state occurs, in the winding temperature estimation unit 4, the corrected temperature computation unit 45 calculates the corrected winding temperature Tm', which is a value obtained by adding the offset value illustrated in FIG. 5.

At this time, the initial value of the estimated temperature change $\Delta T_{est}$ calculated from the d-axis electrical current estimation value $i_{d\_est}$ and the q-axis electrical current estimation value $i_{q\_est}$ is zero; therefore, the initial value of the estimated maximum temperature $T_{est}$ when a motor lock state occurs is the corrected winding temperature Tm', which is the value obtained by adding the offset value to the winding temperature Tm.

The initial value of the estimated maximum temperature $T_{est}$ thus calculated is a value higher than the actual winding temperature of the motor 2, and the difference with respect to the actual winding temperature is small.

The estimated maximum temperature $T_{est}$ subsequently changes as the estimated temperature change $\Delta T_{est}$ changes. As a result, the estimated maximum temperature $T_{est}$ is calculated by adding the estimated temperature change $\Delta T_{est}$ to the corrected winding temperature Tm' for when a motor lock state occurred; therefore, the value would be higher than the actual winding temperature of the motor 2, and the difference with respect to the actual winding temperature would be smaller.

Next, the disposition of the winding temperature sensor 22 in the present embodiment will be described.

Figure 7:
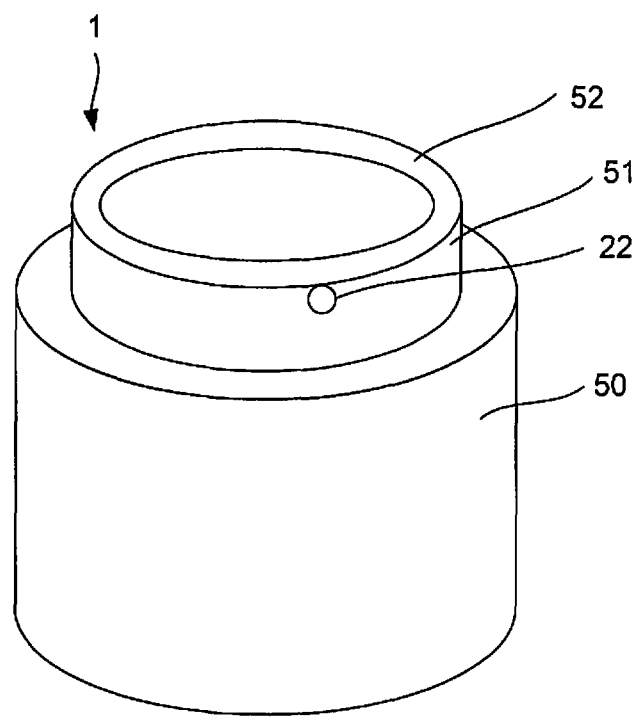
FIG. 7 is a configurational view of a motor.

FIG. 7 is an explanatory diagram illustrating the disposition of the winding temperature sensor 22.

The winding temperature sensor 22 is fixed to a distal end part of a coil end 52 formed by folding back windings 51 at an axial-direction-end part of a stator core 50 constituting the motor 2, the windings 51 being wound around the stator core 50.

The windings 51 of the present embodiment are constituted from a rectangular wire, and are folded back at the coil end 52 at one end part of the stator core 50 and connected (welded) according to the respective phase at the coil end 52 at the other end part.

The winding temperature sensor 22 is positioned, at the distal end part of one of the coil ends 52, so as to be in contact with one of the windings 51. As an example, the winding temperature sensor 22 is fixed to a neutral point bus bar connected to each of the windings 51 comprising the U-phase, V-phase, and W-phase, at a coil end 52.

As a result, regardless of whether an electrical current flows between the U-phase winding and the V-phase winding, between the W-phase winding and the V-phase winding, or between the U-phase winding and the W-phase winding, an electrical current flows in the neutral point bus bar. As a result, the winding temperature sensor 22 is able to measure temperature regardless of which of the windings of the three phases an electrical current flows between.

The winding temperature sensor 22 may be directly fixed to a winding 51 by means of a bolt or an adhesive, etc. In an alternative configuration, the winding temperature sensor 22 is fixed to a component disposed around the windings 51 (e.g., a bracket covering a coil end from a circumferential direction), and the component is attached to the coil end, whereby a winding 51 and the winding temperature sensor 22 are put in intimate contact.

The present embodiment described above is a method for controlling a motor 2 provided with windings of a plurality of phases and a water jacket 21 serving as a channel for cooling water. The motor 2 is provided with the winding temperature sensor 22 serving as a winding temperature detection unit for detecting the temperature of the windings, the cooling water temperature sensor 23 serving as a cooling water temperature detection unit for detecting the temperature of the cooling water, the rotational speed computation unit 15 serving as a rotation detection unit for detecting rotation of the motor 2, and the current vector norm computation unit 41 serving as an input electrical power estimation unit for estimating input electrical power inputted into the motor 2. The control method is provided with: an estimation step for calculating, when the motor 2 is in a lock state, the estimated maximum temperature $T_{est}$ of the winding of the phase in which the temperature becomes the highest from among the windings of a plurality of phases, based on the input electrical power; a correction step for calculating an offset value based on the winding temperature Tm and the cooling water temperature Tw and correcting the estimated maximum temperature $T_{est}$ based on the winding temperature Tm and the offset value; and a control step for controlling the input electrical power according to the estimated maximum temperature $T_{est}$.

Thus, in the present embodiment, an offset value is calculated based on the winding temperature Tm and the cooling water temperature Tw, and an estimated maximum temperature $T_{est}$ calculated based on the winding temperature Tm and the offset value is calculated. The offset value is a value indicating the size of deviation between the actual winding temperature and the winding temperature Tm acquired by the winding temperature sensor 22, and the estimated maximum temperature $T_{est}$ is calculated so that the deviation with respect to the actual winding temperature is small. Controlling the input electrical power for the motor 2 based on the estimated maximum temperature $T_{est}$ causes fewer restrictions to be applied on the output of the motor 2 in response to the torque command value T* for the motor 2, while suppressing the amount of heat generated by the windings.

In the present embodiment, in the correction step, an offset value corresponding to a difference value between the winding temperature Tm and the cooling water temperature Tw is calculated, making it possible to calculate an estimated maximum temperature $T_{est}$ for which the actual winding temperature and the winding temperature Tm acquired by the winding temperature sensor 22 do not appreciably deviate.

In the present embodiment, the offset value is a positive value corresponding to the difference value. Therefore, for the estimated maximum temperature $T_{est}$, it is possible to estimate a temperature having a higher value than the actual winding temperature and that does not deviate from the actual winding temperature.

In the present embodiment, in the estimation step, the estimated maximum temperature $T_{est}$ is estimated based on an electrical current value inputted into the windings of a plurality of phases, making it possible to calculate a temperature approximating the actual winding temperature.

In the present embodiment, the winding temperature sensor 22 is provided, in the stator core 50, at an axial end part of a coil end 52 formed by the windings 51, and is therefore able to detect the winding temperature of any of the three phases of the motor 2.

In the present embodiment, the windings are constituted from rectangular wires; therefore, it becomes easier to determine the transfer function G() based on the electrical power loss $P_{loss}$ of the windings, and easier to estimate the estimated maximum temperature $T_{est}$.

A description has been given for an embodiment of the present invention, but the above embodiment merely indicates an example of application of the present invention, and the technical scope of the present invention is not intended to be limited to the specific configuration of the above embodiment.

The motor control system 100 of the present embodiment described above is not limited to use as a drive source for an electric vehicle, and may be used as a variety of drive sources other than for vehicles.

The invention claimed is:

1. A motor control method for controlling a motor having windings of a plurality of phases and a channel for cooling water,
    the motor having a winding temperature sensor that detects a temperature of the windings, a cooling water temperature sensor that detects a temperature of the cooling water, a rotation sensor that detects rotation of the motor, and an input electrical power computation unit that estimates input electrical power inputted into the motor,
    the motor control method comprising:
    calculating an estimated maximum temperature of the winding of the phase that reaches a highest temperature from among the windings of the plurality of phases based on the input electrical power when the motor is in a lock state;
    calculating an offset value based on a detected temperature of the windings detected by the winding temperature sensor and a detected temperature of the cooling water detected by the cooling water temperature sensor, and correcting the estimated maximum temperature based on the temperature of the windings and the offset value, the offset value being calculated from a predetermined relationship between the offset value and the temperature of the windings and the temperature of the cooling water; and
    controlling the input electrical power according to the estimated maximum temperature.

2. The motor control method according to claim 1, wherein
    the offset value is calculated according to a difference value between the temperature of the windings and the temperature of the cooling water.

3. The motor control method according to claim 2, wherein
    the offset value is a positive value corresponding to the difference value.

4. The motor control method according to claim 1, wherein
    the estimated maximum temperature is estimated based on an electrical current value inputted into the windings of the plurality of phases.

5. The motor control method according to claim 1, wherein
    the winding temperature sensor is provided at an axial end part of a coil end formed by the windings.

6. The motor control method according to claim 1, wherein
    the windings are formed from a rectangular wire.

7. A motor control device for controlling a motor provided with windings of a plurality of phases and a channel for cooling water, the motor having a winding temperature sensor that detects a temperature of the windings, a cooling water temperature sensor that detects a temperature of the cooling water, a rotation sensor that detects rotation of the motor, and an input electrical power computation unit that estimates input electrical power inputted into the motor, the motor control device comprising:

a winding temperature estimation unit for calculating an estimated maximum temperature of the winding of the phase that reaches a highest temperature from among the windings of the plurality of phases based on the input electrical power when the motor is in a lock state;

an adder for calculating an offset value based on a detected temperature of the windings detected by the winding temperature sensor and a detected temperature of the cooling water detected by the cooling water temperature sensor, and correcting the estimated maximum temperature based on the temperature of the windings and the offset value, the offset value being calculated from a predetermined relationship between the offset value and the temperature of the windings and the temperature of the cooling water; and a torque command value computation unit for controlling the input electrical power according to the estimated maximum temperature.

* * * * *